Dec. 21, 1965  M. WAHLSTROM  3,224,340
LEVERAGE PROPORTIONED TRACING MACHINE
Filed Nov. 28, 1962  3 Sheets-Sheet 1

INVENTOR.
Magnus Wahlstrom
BY
*[signature]*
ATTORNEY

Dec. 21, 1965   M. WAHLSTROM   3,224,340
LEVERAGE PROPORTIONED TRACING MACHINE
Filed Nov. 28, 1962   3 Sheets-Sheet 2

INVENTOR
Magnus Wahlstrom
BY
ATTORNEY

Dec. 21, 1965  M. WAHLSTROM  3,224,340
LEVERAGE PROPORTIONED TRACING MACHINE
Filed Nov. 28, 1962  3 Sheets-Sheet 3

INVENTOR.
Magnus Wahlstrom
BY
ATTORNEY

United States Patent Office 3,224,340
Patented Dec. 21, 1965

3,224,340
LEVERAGE PROPORTIONED TRACING MACHINE
Magnus Wahlstrom, Easton, Conn., assignor to The Bridgeport Machines Inc., Bridgeport, Conn., a corporation of Connecticut
Filed Nov. 28, 1962, Ser. No. 240,632
8 Claims. (Cl. 90—13.7)

This invention relates to a machine which in the manner of shape duplicating tracers will generate on a workpiece a configuration like that of a pattern but differing in size.

As herein shown to be embodied, the improvements are incorporated in a hydraulic tracer of the milling machine type which will generate in a workpiece a contour like that of a master pattern but in reduced size.

An object of the invention is to increase the accuracy with which the shape of a master pattern can be reproduced in a workpiece of reduced size.

Another object is to make use of plural rotary tables mounted respectively on separate means of support which are movable toward and away from each other in accordance with departure from circular concentricity of the contour of the pattern that is being traced while both the work and the pattern are simultaneously rotated on their respective tables.

A related object is to cause a work carrying rotating table to slide along a straight guideway to positions that are instantaneously and proportionately determined by straight line movements of a separately slidable pattern carrying rotating table, so that there may be generated in the workpiece by a fixedly stationed tool a configuration in reduced size but otherwise like that of a pattern rotating in wiping contact with a stationary stylus.

Heretofore it has been considered necessary to resort to pantographs or other complicated mechanisms for generating a configuration in a workpiece like, but proportionally smaller than, the configuration of a pattern. It is a general object of these improvements to make use of cooperating parts differing as little as possible from conventional milling machine construction so that proportional tracing can be accomplished with a minimum modification of the standard milling machine with which practically all mechanics are familiar.

These and other objectives of the invention will appear in fuller particular from the following description of a preferred and successful way of practicing an improved method and constructing improved apparatus useful in the carrying out thereof, which description has reference to the appended drawings, wherein.

Figure 4:
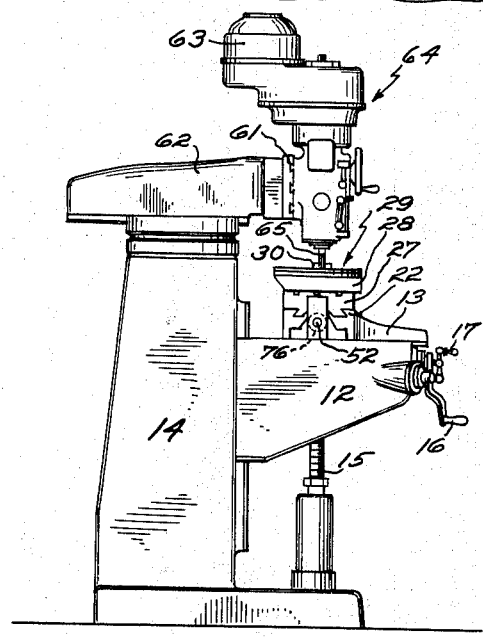
FIG. 4 is a side elevation of a complete milling machine equipped with the mechanisms of FIGS. 1, 2 and 3 and is drawn on a reduced scale.

In the drawings 12 represents the conventional knee and 13 the saddle of a milling machine in which the knee is vertically shiftable along ways on the standard 14 and supported by means of the usual jack screw 15 operated by the crank handle 16. Saddle 13 is adjustable horizontally along ways on the knee toward the right or toward the left in FIG. 4 by means of the usual crank handle 17. In practicing the invention the knee 12 and the saddle 13 remain stationed after working adjustments have been made.

Figure 1:
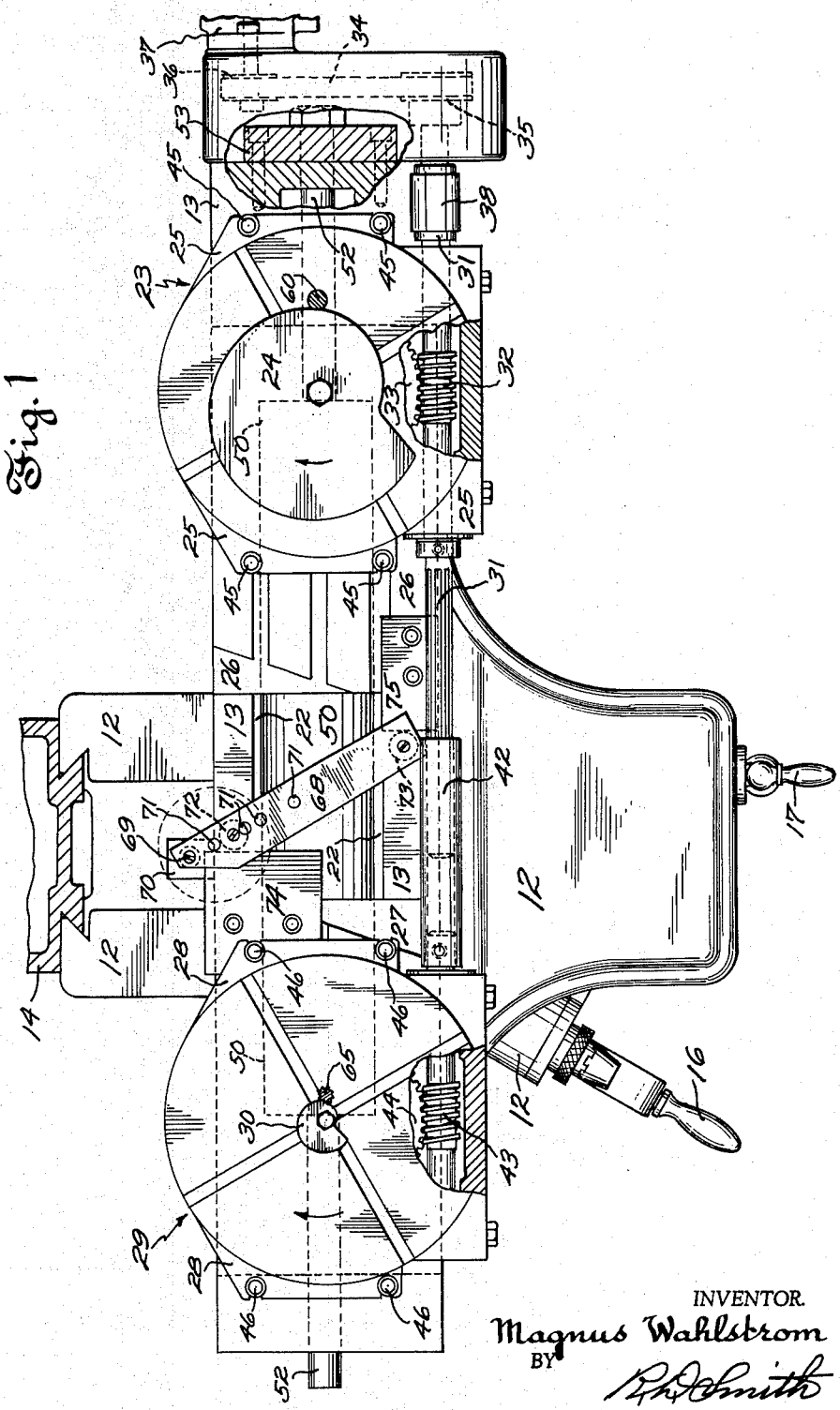
FIG. 1 is a plan view of the supporting parts of a milling machine carrying separate rotary tables for the pattern and workpiece respectively, which tables include non rotating bases that are moved relatively and simultaneously according to the present invention.
Figure 2:
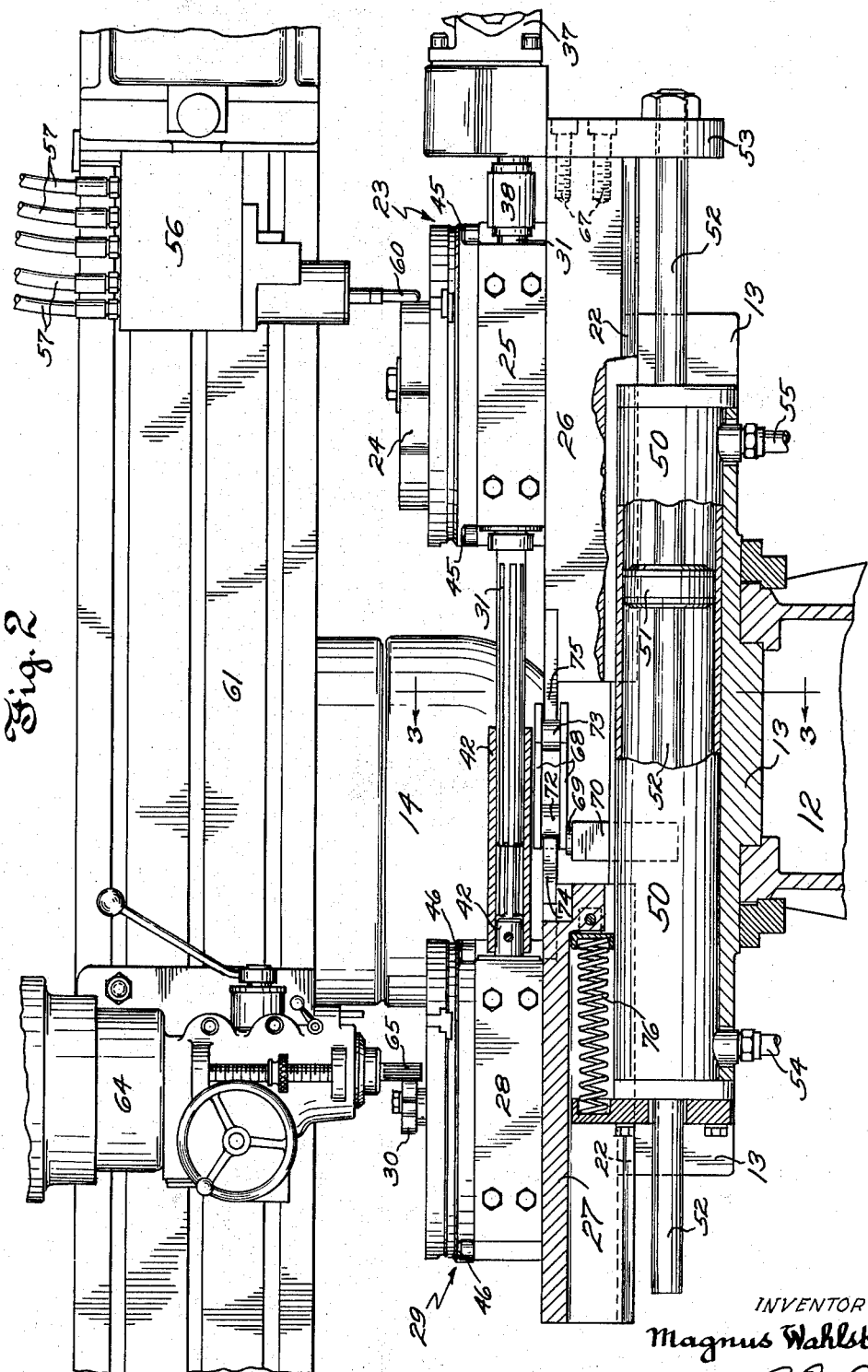
FIG. 2 is a front elevation of the parts shown in FIG. 1 with a stylus and a milling cutter stationed to coact therewith.

Saddle 13 is equipped with the usual dovetail ways 22 extending crosswise the knee 12. At the right end of said ways in FIGS. 1 and 2 there is slidably carried on saddle 13 a rotary table, designated 23 as a whole, having the non rotating base block 25 slidable with carriage 26 along the ways 22 of saddle 13 to which carriage block 25 is secured by bolts 45. Rotary table 23 carries and rotates a pattern 24. At the left end of saddle 13 in FIGS. 1 and 2 a rotary table 29, separate from table 23, is designated 29 as a whole and has a non rotating base block 28 which is secured by bolts 46 to a carriage 27 that is slidable along the saddle ways 22 relatively to table 23. Rotary table 29 carries and rotates workpiece 30 in unison with the rotation of the pattern 24.

Rotation of both tables 23 and 29 is produced in unison by a telescoping drive shaft having a driving portion 31 which carries a worm 32 in mesh with a worm gear 33 which rotates pattern table 23 on its base block 25 through mechanism typified in U.S. Patent No. 2,771,169. Shaft portion 31 is driven by a positive speed belt 34 trained about driven pulley 35 secured on a short extension of shaft 31 that is removably connected to said shaft by a coupling 38. Belt 39 is trained also about a driving pulley 36 on the rotary power shaft of a motor 37 which may be an electric, hydraulic or other form of prime mover. Motor 37 is fixedly carried on the carriage 26 of the pattern table 23. The remaining portion 42 of drive shaft 31 is slidably splined to the driving portion 31 of the shaft and carries a worm 43 in mesh with a worm gear 44 that rotates the workpiece carrying table 29. Both portions 31 and 42 of the telescopic shaft which drives the work tables have suitable bearings (not shown) in the base blocks 23 and 28, respectively, of the rotary tables.

Fixed on saddle 13 beneath and parallel with the ways 22 there is stationed an elongate, hollow, fluid tight cylinder 50 in which cylinder piston 51 reciprocates lengthwise of the cylinder posing responsively to fluid pressure in the latter. Movement of piston 51 produces lengthwise reciprocal movements of a piston rod 52 which has fluid tight slide bearings in the capped ends of cylinder 50. The right end of rod 52 is fixed to bracket member 53 fixedly depending from carriage 26 to travel with the pattern carrying rotary table 23 so carriage 26 and its carried base block 25 will reciprocate horizontally in FIG. 2 in unison with piston 51 carrying therewith the drive motor 37 for the rotary tables.

The position of piston 51 along cylinder 50 is variable by change in the balance between fluid pressures at the left side and at the right side of the piston. The fluid under pressure, preferably a liquid, is admissible to and exhaustible from cylinder 50 at opposite sides of piston 51 through conduit connected nipples such as 54 or 55, the conduits not herein being shown as connected thereto. Balance between the liquid pressure on opposite sides of piston 51 is determined automatically by hydraulic valve means designated in general as 56 in FIG. 2 so as to reciprocate the piston in either direction in positive accordance with progressive variation in the contour of the rotating pattern. It is not necessary herein to show details of the hydraulic valve means 56 because different versions of same are well understood in the art and are disclosed in various patents directed to hydraulic tracing machines, for instance U.S. patents, Nos. 3,055,393 or 2,686,650; 2,331,817 and related patents in the same art. It therefore will suffice herein to point out that in typical hydraulic systems a series of conduits 57, see FIG. 2, may afford fluid communication between a source of fluid pressure (not shown) and the hydraulic valve 56 and through the conduit connections 54 and 55 with the cylinder 50.

Hydraulic valve 56 is fixedly stationed on a cross beam 61 that forms the frontal face of an overarm 62 carried by the turret 63 of a conventional tracing miller. Hydraulic valve 56 is actuated by slight lateral movement of a pilot finger 60 that depends from the housing of valve 56 and is maintained in contacting relation with the non circular configuration, or peripheral contour, of pattern 24. The pilot 60 is yieldingly biased toward the left in FIG. 2 by conventional structure not herein shown whereby to maintain its contacting relationship with the pattern as the periphery of the latter wipes therepast.

Also stationed on the cross beam 61 of overarm 62 is a self powered milling tool attachment 64 which may be like that shown in U.S. Patent 2,275,291 wherein a power motor 63 rotates the work machining tool or rotary cutter 65 about a vertical axis that remains positively fixed in relation to the knee 12 of the milling tracer. The position of tool 65 in relation to rotary work table 23 is such that the workpiece 30 while rotating will be configured by or have its peripheral contour generated by the stationed milling tool 65. The mechanical parts next to be described cause the tool 65 to trace in the workpiece a configuration or peripheral contour proportionally like that of the pattern 24 and in reduced size.

Figure 3:
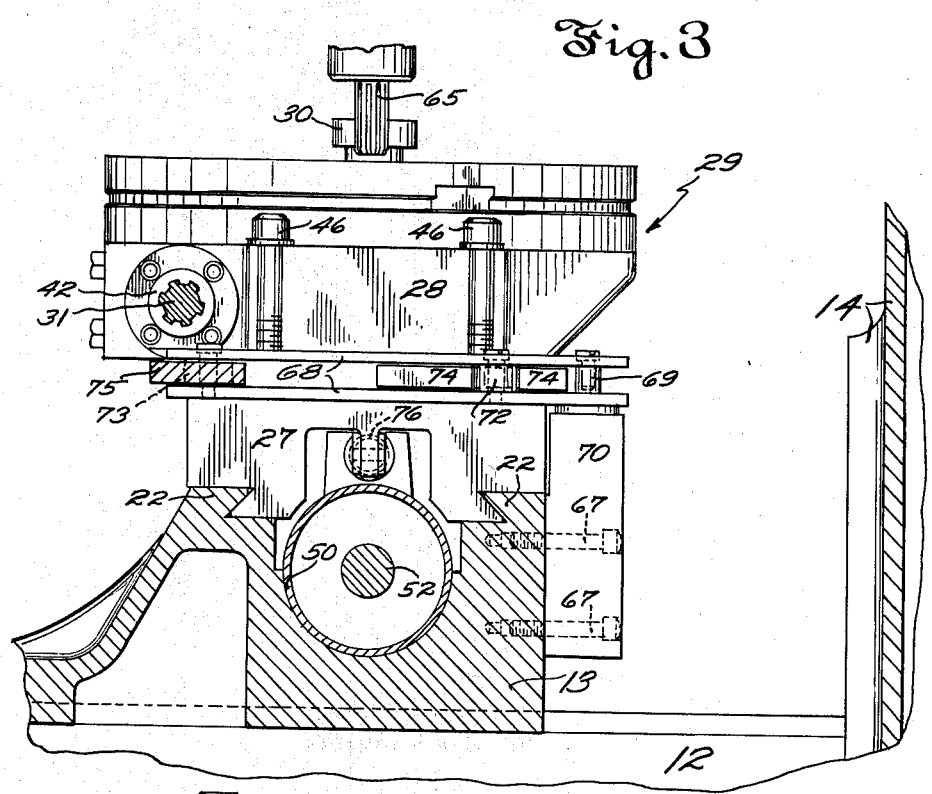
FIG. 3 is a view taken in section on the plane 3—3 in FIG. 2 looking in the direction of the arrows.

While a proportioning device for the purposes of the invention may take various forms, that shown herein comprises a rigid tandem arm 68 located intermediate the relatively slidable carriages 26 and 27 and pivotally anchored to the saddle 13 by a hinge pin 69 stationed on a bracket 70 that is secured on the saddle 13 by bolts 67 as best shown in FIG. 3. A series of threaded holes 71 spaced along the proportioning arm 68 affords a choice of changeable locations for antifriction thrust elements herein represented by a roller 72 at short lever arm distance from pivot pin 69 and a roller 73 at longer lever arm distance from said pivot. Roller 72 engages a lug 74 fixed on and projecting to the right from carriage 26 and simultaneously roller 73 engages a lug 75 fixed on and projecting to the belt from carriage 27. An expansion spring coil 76 under compression between one end of the saddle carried cylinder 50 and the rotary table carriage 27 constantly urges the latter toward the right in FIGS. 1 and 2 along the saddle 13 so that lug 74 thrusts constantly against roller 72 to swing proportioning arm 68 counterclockwise in FIG. 1. Thus roller 73 exerts constant thrust toward the right on the lug 73 of carriage 26 which urges the rotating pattern 24 toward the stylus 60. Through the hydraulic system including valve 56 hereinbefore mentioned stylus 60 causes the piston 51 and hence the rotary table 23 always to assume a position that maintains contact between the traced peripheral surface of the rotating pattern and stylus 60, due to modulated opening and closing of ports in the hydraulic valve 56. The corresponding oscillation of proportioning arm 68 about its stationary pivoted anchorage 69 thereby causes simultaneous but smaller extents of sliding movement of work carrying rotary table 29 in corresponding direction in FIG. 1. Movements of table 29 toward the left are forced by the shifting of piston 51 toward the left against the opposition of spring 76 and the latter stands ready at all times to cause movement of tables 23 and 29 toward the right whenever the pattern carriage 27 retreats in that direction.

While in practice it is preferred for heavy work that the piston 51 and its hydraulic system be employed for variably shifting the rotary table 23 right or left, such piston and hydraulic system may be omitted in cases of suitably light work. In that case the stylus 60 will be positively fixed against movement relative to the cross beam 61 and the pattern 24 will be constantly pressed thereagainst by spring 76 acting through carriage 27 and the proportioning arm 68. A simple marking tool that will merely scratch a configuration, say on a template, can be substituted for the milling cutter 65.

This and other obvious departures from the exact nature and relationship of parts herein illustrated are contemplated by the appended claims and intended to be covered thereby, as is also the method of arriving at the desired result residing in the relationship of simultaneous movements of the pattern and of the workpiece by whatever apparatus accomplished.

What is claimed is:

1. In a milling machine for duplicating in a rotating workpiece a configuration proportionally like that of a rotating pattern, the combination of an elongate saddle stationed on the milling machine having at least one rectilinear longitudinal guideway, a first carriage slidable along a guideway on said saddle, a first pattern carrying rotary table mounted on said first carriage, a second carriage slidable along a guideway on said saddle aligned straightaway lengthwise with said rectilinear guideway, a second work carrying rotary table mounted on said second carriage, means controlled by the configuration of a pattern rotating on said first table operative to cause rectilinear sliding movement of said first carriage in at least one direction along its said guideway, power means to rotate both of said tables simultaneously, a proportioning device extending in crosswise relation to said guideways between said carriages swingable about a hinge pivot stationed on said saddle and having movement transmitting connection with both of said carriages whereby said second carriage is caused to slide along its said guideway in proportion to sliding movement of said first carriage, and a milling cutter stationed in relation to said saddle in position to generate in the workpiece a configuration proportioned to that of the pattern.

2. In a milling machine for duplicating in a rotating workpiece a configuration proportionally like that of a rotating pattern, the combination defined in claim 1, in which the said means to rotate both of the said tables simultaneously includes a telescopic shaft extending from one to the other of said tables and operatively connected to drive both of said tables at like angular speed.

3. In a milling machine for duplicating in a rotating workpiece a configuration proportionally like that of a rotating pattern, the combination defined in claim 1, in which the said two carriages present respective thrust surfaces facing toward each other, and the said proportioning device includes a movement reducing arm swingable about the said hinge pivot having simultaneous engagement with said thrust surfaces of both of said carriages at respectively different distances from the said hinge pivot of said proportioning device.

4. In a milling machine for duplicating in a rotating workpiece a configuration proportionally like that of a rotating pattern, the combination defined in claim 1, in which the said two carriages present respective thrust surfaces facing toward each other, and the said proportioning device includes a movement reducing arm swingable about the said hinge pivot, together with antifriction elements carried by said arm in rolling contact simultaneously with said thrust surfaces of both of said carriages.

5. In a milling machine for duplicating in a rotating workpiece a configuration proportionally like that of a rotating pattern, the combination defined in claim 1, in which the said two carriages present respective thrust surfaces facing toward each other, and the said proportioning device includes a movement reducing arm swingable about the said hinge pivot, together with rollers pivotally carried by said arm at respectively different distances from the said hinge pivot in rolling contact with said different thrust surfaces respectively of said carriages.

6. In a milling machine for duplicating in a rotating workpiece a configuration proportionally like that of a rotating pattern, the combination defined in claim 1, together with yieldable means operative to bias the said second carriage in a direction to exert thrust on the said proportioning device toward the said first carriage, whereby to prevent back lash between said proportioning device and said carriages at all times.

7. A machine for duplicating in a workpiece a configuration like that of a pattern differing therefrom in size comprising, supporting framework having straight guideways extending in a common direction, a first rotary table slidable along one of said guideways adapted to carry and rotate a pattern, a second rotary table slidable along one of said guideways relatively to said first rotary table adapted to carry and rotate a workpiece, means to rotate said tables simultaneously during sliding movement thereof relative to each other, a stylus stationed on said framework in tracing relation to a pattern carried and rotated by said first rotary table, means responsive to rotary movement of said pattern relative to said stylus operative to cause said first rotary table to slide along its guideway in accordance with configuration of the rotating pattern, a tool so stationed on said framework in relation to a workpiece carried and rotated by said second rotary table as to generate in said workpiece a configuration according with that of said pattern, and means to transmit differential sliding movement from said first rotary table to said second rotary table while both of said tables rotate, whereby a configuration will be generated in the workpiece proportionally like that of said pattern, said means including a rigid movement proportioning device having a pivotal mounting on said framework, thrust elements carried in spaced relation by said proportioning device operatively related to one of said rotary tables to cause the latter to slide and operably related simultaneously to another of said tables to be caused to slide thereby, and resilient means biasing one of said rotary tables to slide toward the other rotary table.

8. A machine as defined in claim 7, in which the said resilient means biases the said first rotary table to slide toward the said proportioning device in a direction to transmit sliding movement from said first rotary table to the said second rotary table in the same direction.

References Cited by the Examiner
UNITED STATES PATENTS

| | | | |
|---|---|---|---|
| 346,596 | 8/1886 | Mackintosh | 90—13.3 X |
| 560,574 | 5/1896 | Delin | 90—13.7 |
| 2,718,702 | 9/1955 | Glass | 90—13.1 X |
| 2,741,163 | 4/1956 | Smedley | 90—13.4 |
| 2,814,237 | 11/1957 | Schmid | 90—13.4 |
| 2,844,074 | 7/1958 | Meyer | 90—13.4 |

WILLIAM W. DYER, Jr., *Primary Examiner.*

LEON PEAR, *Examiner.*